(12) United States Patent
Lambeth et al.

(10) Patent No.: US 8,195,774 B2
(45) Date of Patent: Jun. 5, 2012

(54) DISTRIBUTED VIRTUAL SWITCH FOR VIRTUALIZED COMPUTER SYSTEMS

(75) Inventors: Andrew Lambeth, San Mateo, CA (US); Shudong Zhou, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 650 days.

(21) Appl. No.: 12/126,777

(22) Filed: May 23, 2008

(65) Prior Publication Data

US 2009/0292858 A1 Nov. 26, 2009

(51) Int. Cl.
*G06F 15/177* (2006.01)
(52) U.S. Cl. .................................. 709/220
(58) Field of Classification Search .............. 709/220
See application file for complete search history.

(56) References Cited

U.S. PATENT DOCUMENTS

| | | | |
|---|---|---|---|
| 5,805,790 A | | 9/1998 | Nota et al. |
| 6,075,938 A | * | 6/2000 | Bugnion et al. ............ 703/27 |
| 6,854,115 B1 | | 2/2005 | Traversat et al. |
| 6,934,755 B1 | | 8/2005 | Saulpaugh et al. |
| 6,941,410 B1 | | 9/2005 | Traversat et al. |
| 7,191,441 B2 | | 3/2007 | Abbott et al. |
| 7,454,756 B2 | * | 11/2008 | Lantz et al. ................. 718/108 |
| 2007/0233825 A1 | * | 10/2007 | Brownell et al. ............ 709/220 |
| 2008/0002683 A1 | * | 1/2008 | Droux et al. ................ 370/389 |

OTHER PUBLICATIONS

International Search Report and Written Opinion as mailed in PCT Application No. PCT/US2009/038604 on Oct. 29, 2009.

* cited by examiner

*Primary Examiner* — Jerry Dennison
(74) *Attorney, Agent, or Firm* — Leonard Heyman

(57) ABSTRACT

A method for persisting a state of a virtual port in a virtualized computer system is described. A distributed virtual port (DVport) is stored in a persistent storage location, the DVport comprising a state of a corresponding virtual port and configuration settings of the virtual port. In addition, an association between the virtual port and the virtual network interface card (VNIC) connected to the virtual port is stored. When a virtual machine corresponding to the VNIC is restarted, the state from the DVport is restored to a new virtual port from the persistent storage location.

23 Claims, 7 Drawing Sheets

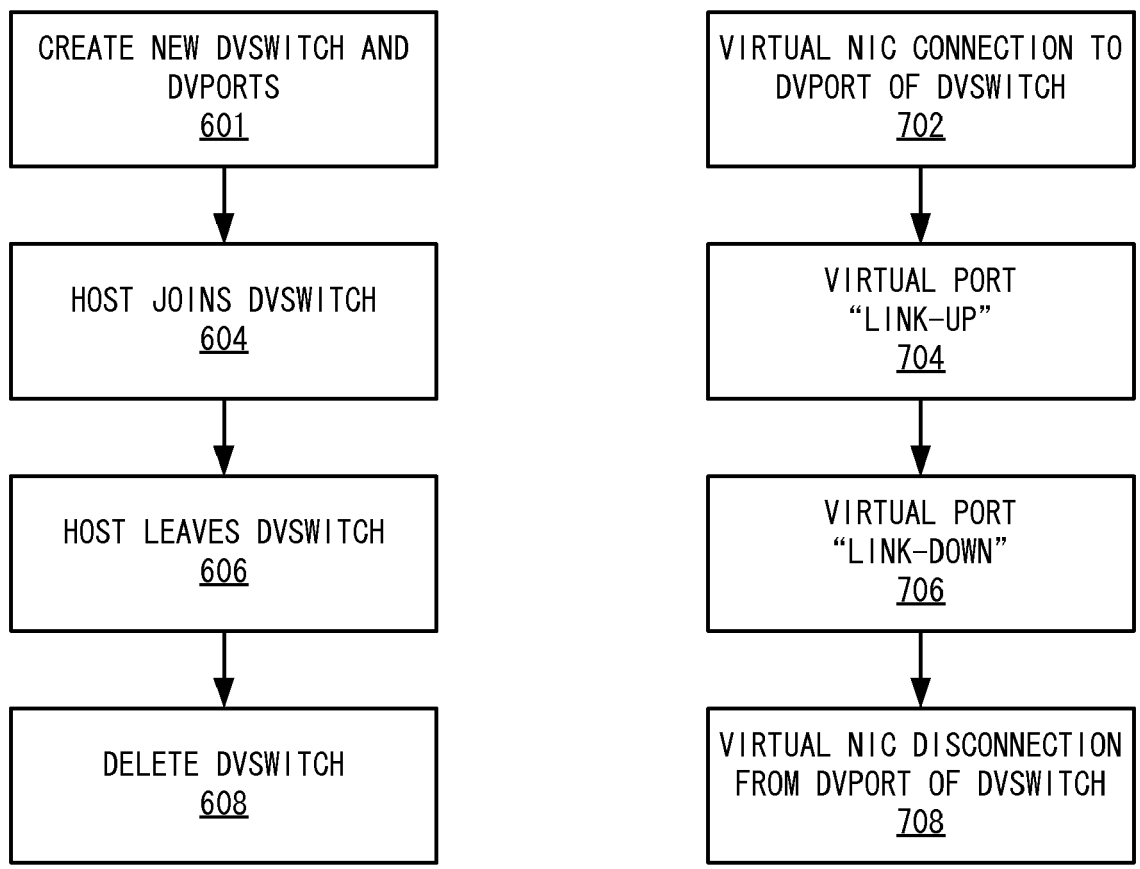

DISTRIBUTED VIRTUAL SWITCH FOR VIRTUALIZED COMPUTER SYSTEMS

BACKGROUND

A virtual machine (VM) is an abstraction—a "virtualization"—of an actual physical computer system. FIG. 1 shows one possible arrangement of computer system 70 that implements virtualization. In this arrangement, a plurality of VMs 20, . . . 20-n is abstracted by virtualization software 15 on a host 10. In the present example, virtualization software 15 includes a VM kernel 60 and one or more VM monitors (VMMs) 50. Other configurations are possible to provide virtualization functionality as generally understood in the art. Host 10 typically includes one or more processors 11, memory 13, some form of mass data storage 14, one or more network interface cards (NICs) 17 and various other devices 19. As generally known, the term "NIC" commonly refers to components implementing a network connection regardless as to whether it exists on a separate card or is integrated with a main computer board.

Each VM 20, . . . 20-n can be thought of as including both virtual system hardware 22 and guest system software 30. Virtual system hardware 22 typically includes one or more virtual processors 28, virtual memory 23, at least one virtual disk 24, and one or more virtual network interface card(s) (VNICs) (only one shown). One or more additional virtual devices 27, such as virtual user interface devices, universal serial bus (USB) ports, etc., may also be included. Virtual system hardware 22 is shown in FIG. 1 in a dashed box because it is merely a conceptualization that does not exist apart from virtualization software 15 and host 10. This conceptualization is merely one representation of the execution environment of guest system software 30. All of the virtual hardware components of VM 20 are actually implemented by virtualization software 15 using known techniques to emulate the corresponding physical components. In the present example, virtualization software 15 includes one or more VM monitors (VMMs) 50 which each include device emulators 53.

Guest system software 30 includes guest operating system (OS) 32 and drivers 34 as needed for VNIC 25, virtual disk 24 and other various virtual devices 27. Guest OS 32 may be an off-the-shelf OS designed to run directly on a hardware platform (i.e., not in a virtual machine) or it can be an OS specially modified to run in a para-virtualized environment, depending on what is required or permitted by the particular implementation of virtualization software 15. The term "virtualization software" therefore refers herein to a software layer implanting either full virtualization or para-virtualization. "Full virtualization" refers to a system in which no software components of any form are included in the guest other than those that would be found in a non-virtualized computer; thus, the guest OS could be an off-the-shelf, commercially available OS with no components included specifically to support use in a virtualized environment. In contrast, a "para-virtualized" system is not "fully" virtualized. Rather, the guest is configured in some way to provide certain features that facilitate virtualization. For the purposes herein, the term "virtualization" includes both full and para-virtualization.

In addition to guest operating system 32, one or more guest applications 36 execute "within" VM 20, although those skilled in the art will understand that execution of guest OS and guest application instructions occurs via virtualization software 15 and host platform 10. Guest application 36 may be any type of application designed to work with guest operating system 32. As generally understood in the art of virtualization, user input and output to and from VM 20 may be redirected by virtualization software 15 to a remote terminal (not shown) or through a terminal application (not shown) executing on console operating system 40.

Virtualization software 15 may include one or more software components and/or layers, possibly including one or more of the software components known in the field of virtual machine technology as "virtual machine monitors" (VMMs), "hypervisors," or virtualization kernels (referred to herein as "VM kernels"). Because virtualization terminology has evolved over time and has not yet become fully standardized, these terms do not always provide clear distinctions between the software layers and components to which they refer. As used herein, the term, "virtualization software" is intended to generically refer to a software layer or component logically interposed between a virtual machine and the host platform.

In the virtualization system shown in FIG. 1, VMMs 50 are deployed on top of VM kernel 60. VM kernel 60 may be constructed specifically to provide efficient support for the VMs and directly (i.e., not using a general-purpose host OS, such as Linux or Windows) interfaces with the physical resources and devices making up host 10. Note that the VM kernel 60 is not the same as a kernel within the guest OS 32. As is well known, each typical operating system has its own OS kernel. Note also that VM kernel 60 can be viewed as being part of the host platform for the VM even though the configuration shown in FIG. 1 is commonly termed "non-hosted."

In a different, well-known configuration (not shown) virtualization software 15 could include a general purpose operating system (not shown) instead of a VM kernel. Such a configuration is often referred to as a "hosted" virtualization system, with the general purpose operating system as the host OS. The host OS is configured to perform certain device input/output (I/O) operations for the various VMs executing on the system, alongside and sometimes at the request of the VMM. In this case, the host OS may be considered to be part of the virtualization software that enables the virtualization. The selection of the configuration of the virtualization software, i.e., whether hosted or not, or whether it is fully virtualized or para-virtualized, are made based on the relative advantages and disadvantages of each type, which are well known to those skilled in the art of virtualizing computer systems.

FIG. 2 illustrates VMs 20-1, 20-2 and VMMs 50-1, 50-2 transmitting network frames to network interface card (NIC) 17 of host 10-1 through virtual switch 65. Virtualization software 15 transmits network frames from VMs 20-1, 20-2 via virtual NICs (VNICs) 25-1, 25-2 to physical NIC 17 of host computer 10-1. Each VNICs 25-1, 25-2 is communicatively coupled to a corresponding virtual port 62, 64 of virtual switch 65. Virtual switch 65 is a logical collection of virtual ports 62, 64, and maintains a forwarding database (not shown) of VNIC addresses, e.g., MAC addresses. Each virtual port 62, 64, 66 is a logical rendezvous point for a corresponding VNIC and the software components that forward traffic to and from the VNICs. In this manner, virtual switch 65 determines how and where to route network frames transmitted to and from VNICs 25-1, 25-2 and NIC 17. Thus, virtual switch 65 functions as a software bridge that allows multiple VMs to share zero, one, or multiple physical NICs. If zero (i.e., no) physical NICs are installed on host 10-1, for example, then virtual switch 65 may function as a virtual network that connects VMs 20-1, 20-2 running on host 10-1.

Each VNIC 25-1, 25-2 is an emulated network device, presented by virtualization software 15 to VMs 20-1, 20-2 requiring network access. Thus, virtual switch 65 handles forwarding traffic between the VNICs 25-1, 25-2, connected to virtual switch 65 and possibly bridging to a physical network via one or more physical NICs. In general, virtual switches are capable of determining, based on a network frame's header, whether or not the frame is locally destined, and if it is locally destined, which virtual machines should receive the frame. Network administrators are generally required to manage the virtual switches 65 to configure these features. Since the number of virtual switches 65 are typically greater in number than their physical counterparts, the network administrator may be required to perform repetitive tasks of configuring many virtual switches 65.

One advantage of virtualization technology is that it allows a VM to be migrated from one physical host to another by powering down or suspending the VM on one host, and powering up or resuming the VM a different physical host. In this context, "suspending," refers to the execution of the VM being temporarily or permanently halted by the virtualization software. It should be noted that the execution of a VM is frequently suspended even though it is "running." A VM may be momentarily suspended, for example, in order to allow execution of another co-running VM to proceed. In contrast, "powering off" a VM refers to virtualizing the power-down procedure of a physical machine. As with a physical computer, a VM may be powered down in a methodical manner in which each process is notified by the OS of impending shut down, allowing each open application to save its data and exit, or the power down can be performed by simulating a power-off, in which case all running processes are terminated, losing any unsaved data or state associated with running processes. After powering off a VM, resumption of execution typically requires rebooting the guest OS and restarting any applications, whereas resuming execution of a suspended VM requires reloading the state into the VM and resuming execution.

When a VM is suspended, the processes are halted and the VM's state, including its memory contents, register settings, virtual device states, etc., may be written to a disk. In the example shown in FIG. 2, VM 20-2 may be migrated by suspending or powering off VM 20-2 on host 10-1 and resuming or powering on VM 20-2 on host 10-2, as represented by arrow 75. The term "migration" therefore refers to a process of moving a VM from one host to another by suspending or powering off a VM on one host and resuming or powering on that VM on a different host.

Unfortunately, migrating a VM from one host to another may involve some loss in state associated with the VNIC for the migrated VM. Conventionally, when VM 20-2 is migrated from host 10-1 to host 10-2 (as indicated by arrow 75), connection 56 between VNIC emulator 55-2 and virtual port 64 is lost, as indicated by cross 52, and a new connection 58 is established between VNIC emulator 55-3 and virtual port 66 on virtual switch 65' implemented by virtualization software 15' on host 10-2. The MAC address and other state information associated with VNIC 25-2 can be transferred to VNIC 25-3 as part of the attributes of the virtual devices making up VM 20-2, so that resumed VM 20-2 maintains its position on the network. However, VM 20-2 further connects to virtual port 66 of virtual switch 65' on host 10-2, presuming new port 66 to offer similar network connectivity, but making no assumptions about any preservation of state not associated specifically with virtual NIC device 25-2 (e.g., MAC address, broadcast/multicast filter, etc). Thus, in the course of this VM migration process, state information that may be accumulated on virtual switch port 64 is typically lost.

In addition to these heretofore unrecognized problems, a network administrator who is viewing a virtual network from the switch point of view has no consistent topology to work with if VMs are migrating while he attempts to view and/or reconfigure the virtual network.

SUMMARY

Described herein is a method for persisting a state of a virtual port in a virtualized computer system. In certain embodiments, a distributed virtual port (DVport) is stored in a persistent storage location, the DVport comprising a state of a corresponding virtual port and configuration settings of the virtual port. In addition, an association between the virtual port and the virtual network interface card (VNIC) connected to the virtual port is stored. When a virtual machine corresponding to the VNIC is restarted, the state of the DVport is retrieved from the persistent storage location and applied to a new virtual port.

BRIEF DESCRIPTION OF THE DRAWINGS

FIG. 6 illustrates a process for creating and deleting a DVswitch, according to one embodiment.

FIG. 7 illustrates a process for connecting or disconnecting a VNIC to or from a DVport of a DVswitch, according to one embodiment.

DETAILED DESCRIPTION OF EMBODIMENTS

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Figure 3:
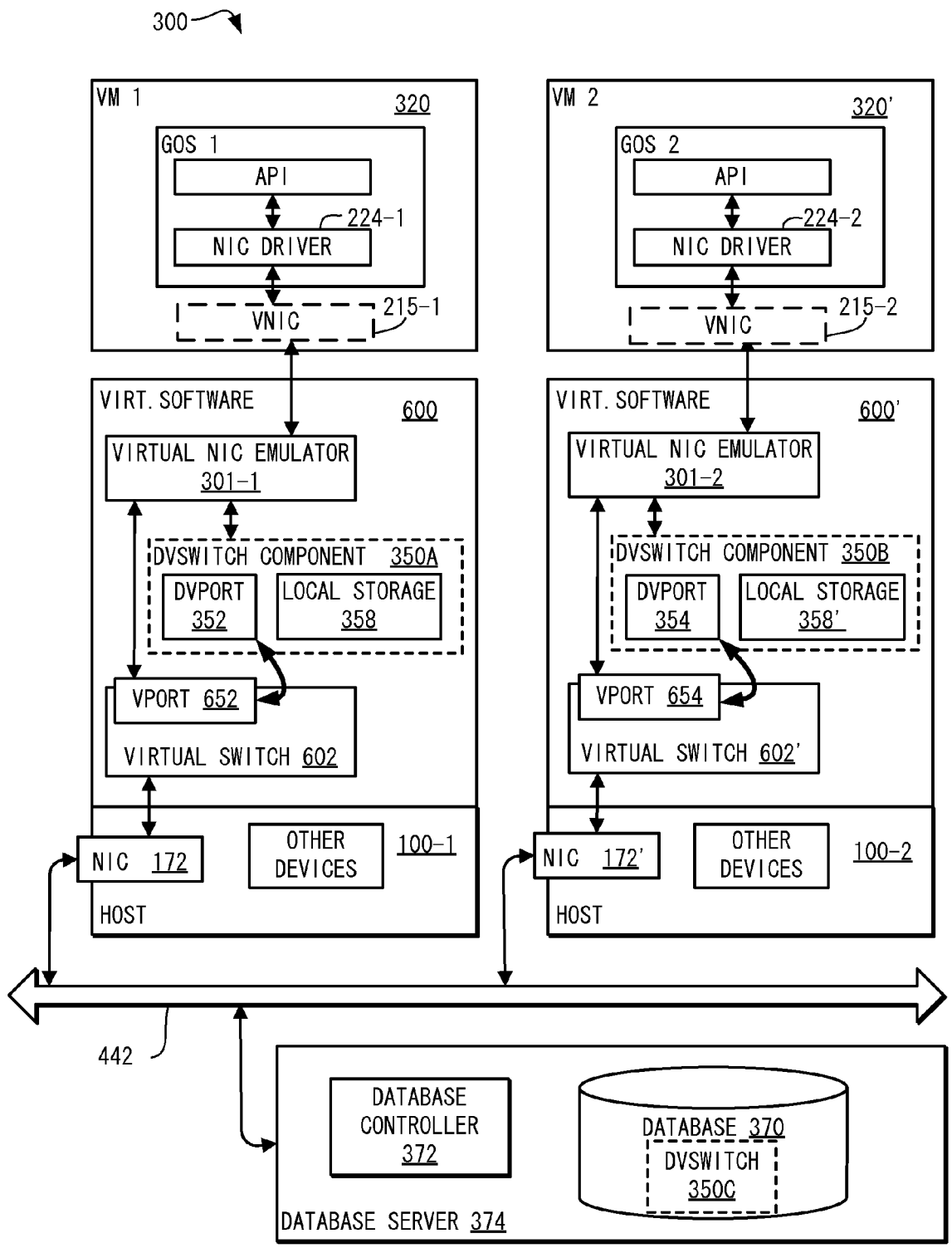
FIG. 3 illustrates a distributed virtual switch (DVswitch), according to one embodiment.

FIG. 3 illustrates, by way of example, a managed collection 300 of virtualized computer systems. A distributed virtual switch (DVswitch) comprises DVswitch components 350A, 350B, and 350C, according to one embodiment. The term "distributed" herein is used to describe objects which may migrate from one physical host to another or span multiple hosts in a managed collection of host computers. The DVswitch is therefore a software abstraction which binds similar virtual switches 602, 602' in the managed collection into a single logical configurable entity. FIG. 3 represents only two hosts 100-1, 100-2 each having only a single VM 320, 320' and corresponding VNIC emulators 301-1, 301-2, only for purpose of illustration. It should be recognized that a DVswitch may span any number of hosts each having any number of VMs, each, in turn, having any number of VNICs, any of which may be limited in number by available hardware resources of the individual hosts.

The DVswitch, as a software abstraction, resides on a variety of hardware in a distributed manner, hence the term "distributed" virtual switch. For example, DVswitch components 350A, 350B, and 350C reside in hosts 100-1, 100-2 as well as database 370. DVswitch components 350A, 350B, and 350C are illustrated in FIG. 3 with a dotted line box indicating portions of DVswitch 350A, 350B, and 350C that make up a DVswitch. In addition to these components, logic implementing DVswitch functionality is located in virtualization software 600 and database controller 372 as will be described in more detail below.

As shown in FIG. 3, a single virtual port 652, 654 is maintained for each VNIC 215-1, 215-2, respectively. Each VNIC emulator 301-1, 301-2 interacts with NIC drivers 224-1, 224-2 in VMs 200-1, 200-2 to send and receive data to and from VMs 320, 320'. For example, each VNIC emulator 301-1, 301-2 may maintain the state for one or more VNICs for each VM 320, 320'. Alternatively, multiple instances of VNIC emulators 301-1, 301-2 (only one shown for each host) may be instantiated within a virtualization software layer. In either case, a single VM may have one or more VNICs, which may be implemented by one or more VNIC emulators. For the purpose of illustration, FIG. 3 shows only one VNIC for each VM, and only one VM for each host. Those skilled in the art will recognize that discussion herein of VNICs 215-1, 215-2 is actually a discussion of a VNIC state implemented and maintained by each VNIC emulator 301-1, 301-2. As mentioned previously, virtual devices such as VNICS 215-1, 215-2 are software abstractions that are convenient to discuss as though part of VMs 200-1, 200-2, but are actually implemented by virtualization software 600, 600' using emulators 301-1, 301-2. The state of each VM 200-1, 200-2, however, includes the state of its virtual devices, which is controlled and maintained by the underlying virtualization software 600, 600'. When a VM is suspended or shut-down and migrated, its state, which includes network settings such as the MAC addresses of any VNICS, are migrated along with the VM.

Similar virtual switches 602, 602' that are connected to the same physical network 442 are managed using one DVswitch. Physical network 442, may be, e.g., a local area network. In FIG. 3, the DVswitch includes distributed virtual ports (DVports) 352, 354. A DVport is a software abstraction that encapsulates the "personality" (both configuration and runtime state) of a corresponding virtual port. Thus, DVport 352 contains one or more data structures representing the configuration and runtime state of virtual port 652 of a virtual switch 602. Likewise, DVport 354 contains one or more data structures representing the configuration and runtime sate of virtual port 654 of virtual switch 602'. DVports are created with a configuration predefined by a network administrator. Virtual ports 652, 652' are created and start with a blank configuration state, but once associated with a DVport, assume the configuration and runtime state of the associated DVport. When a VM is migrated or powered off and on, the "connection" between a DVport and a virtual NIC is not affected because the DVport persists and migrates with the VM to which it is connected.

The term "connection" is used herein to describe an association of a virtual NIC with a DVport. In one embodiment, this association is maintained locally by virtualization software 600, 600' and in a table or other data structure within database 370 as described in more detail below. When a connection to a DVport occurs, another virtual NIC cannot be connected to that DVport without explicitly disconnecting the already connected virtual NIC. The term "Link Up" is used herein to describe a state where a virtual NIC and a virtual port have been made ready to send and receive frames. If and only if both the virtual NIC and the virtual port agree on this link-up state, can the network traffic be forwarded to and from the virtual NIC by the virtual switch. Note that the term "filter" is used herein to describe a software component that interposes on an Input Output (I/O) path between the virtual port and the virtual NIC. The term "forwarding engine" is used herein to describe a software component that is able to build and maintain tables mapping layer 2 hardware addresses (e.g., MAC addressees) to virtual ports, and to make forwarding decisions based on those tables.

DVswitch and DVport State Management

DVswitch 350 and its DVports 352, 354 are created based on physical resources which should be available to physical NICs 172, 172' in the managed domain of hosts 100-1, 100-2. Once created, database 370 stores the state of DVswitch 350 and DVports 352, 354. Database 370 maybe provided on database controller 372 connected to hosts 100-1, 100-2 via physical network 442. In an alternate embodiment, a second physical network (not shown) connects database server 374 to hosts 100-1, 100-2, via second NICs (not shown) installed on each host 100-1, 100-2, to further isolate database server 374 from network resources (e.g., the Internet) that may pose a security risk. Hosts 100-1, 100-2 in the managed domain therefore have access to the database 370. The managed domain is a collection of hosts 100-1, 100-2 covered by an instance of the database 370. For states that are global to a given DVswitch 350, database 370 pushes read-only copies to each of the hosts 100-1, 100-2 in the managed domain. Because hosts 100-1, 100-2 do not need to alter the data and updates to it are infrequent, pushing updates to all hosts 100-1, 100-2 aggressively does not introduce unacceptable overhead. States that are specific to a given DVport 352, 354, however, do need to be altered by the host where the DVport's peer virtual port 652, 654 is located, and updates are frequent. Thus, the database 370 pushes DVport state only to the necessary host and polls that host periodically and around certain critical events for updates in the states. In addition to being stored permanently in database 370, some DVswitch state may be cached on each host in the managed domain to avoid unnecessary communication with database 370. A process residing on database 370 is responsible for pushing relevant updates to each host's local storage 358, 358' in the managed domain. It the phrase "local storage" should be interpreted broadly herein to reflect a data storage device or system that is readily accessible by the host. In one embodiment, hosts 100-1, 100-2 always assume that their local local storage 358, 358' is up to date, and that any updates they make to the local storage will be pulled back to database 370 by a database server process of database controller 372 in a timely manner. In the event that database 370 is offline or a host loses connectivity to database 370, the host can continue operations in the current state, albeit without updates from database 370 and without assurances that changes it makes to its local storage will be persisted. The risks associated with such a loss of connectivity are minimal (i.e., unlike a distributed file system where irretrievable data loss may occur if the synchronization mechanism is lost, here the only resources being shared are conceptual).

DVport Ownership

In one embodiment, a two-level ownership model is applied to the DVport state. The first level of ownership refers to which host currently has the rights to modify the state of a particular DVport. In one embodiment, such ownership of a DVport state is granted implicitly by database controller 370 when it pushes the state of the DVport to a given host. Database controller 370 is responsible for granting and revoking host ownership of DVports 352, 354. Once a host 100-1 or 100-2 has been granted ownership of a DVport it retains ownership until database controller 372 explicitly revokes the ownership.

The second level of ownership refers to which virtual NIC is currently connected to the DVport. When virtual NIC 215-1 makes a new "connection" to DVport 352, virtual NIC 215-1 issues a request to database controller 372 for a connection identifier (ID) for DVport 352. In one embodiment, virtual NIC 215-1 identifies DVport 352 by a DVport number (or other identifier) which may be manually selected by the user (i.e., administrator) or automatically assigned by a management application during configuration of the DVswitch. For example, a DVport number identifying a particular DVport by its number may be configured along with other configuration settings for a VM. If the connection ID field is empty for the requested DVport, then a new connection ID is generated by database controller 372 and returned to virtual NIC 215-1. When virtual NIC 215-1 receives the connection ID for DVport 352, it owns rights to use network resources backing (i.e., associated with) DVport 352. The connection ID and DVport number may be stored along with other configuration settings for the VM, thereby creating an association between the VM and the DVport. As noted above, virtual NICs 215-1, 215-2 are software abstractions of physical NICs implemented by virtual NIC emulators 301-1, 301-2, respectively. Therefore, the code for requesting and obtaining a connection ID may reside in components of virtual NIC emulators 301-1, 301-2 or other components of virtualization software 600, 600' layer of each host 100-1, 100-2.

If the current connection ID field for a particular DVport is not empty at the time of the connection request, then another virtual NIC currently owns connection rights and the new connection request will be denied. Each time a virtual NIC is granted a connection to a DVport, the virtual NIC stores the connection ID and uses that for future operations. The virtual NIC may release the connection at any time, at which point it becomes available for use by another virtual NIC. It is possible to revoke a connection by simply generating a new connection ID for the DVport or by clearing the current connection ID field of the DVport. Once a connection is revoked, attempts to use the old connection ID will fail.

In another embodiment, a DVport may be owned collectively by a cluster of hosts, without explicit assignment to a single host. Any conflicts arising from multiple hosts attempting to claim the same DVport can be resolved via a peer-to-peer election algorithm.

DVport Operation

Figure 1:
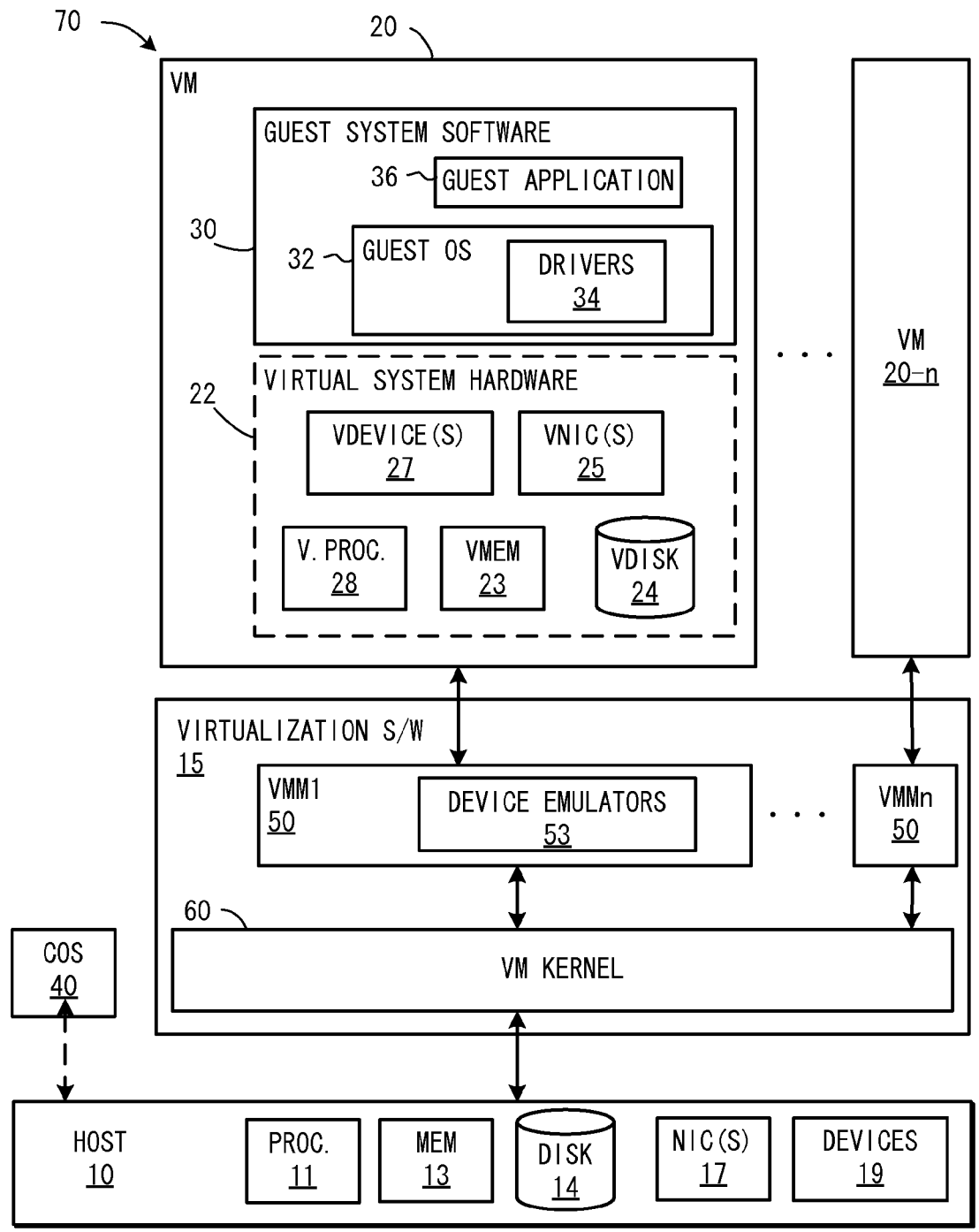
FIG. 1 illustrates a non-hosted virtualized system.
Figure 2:
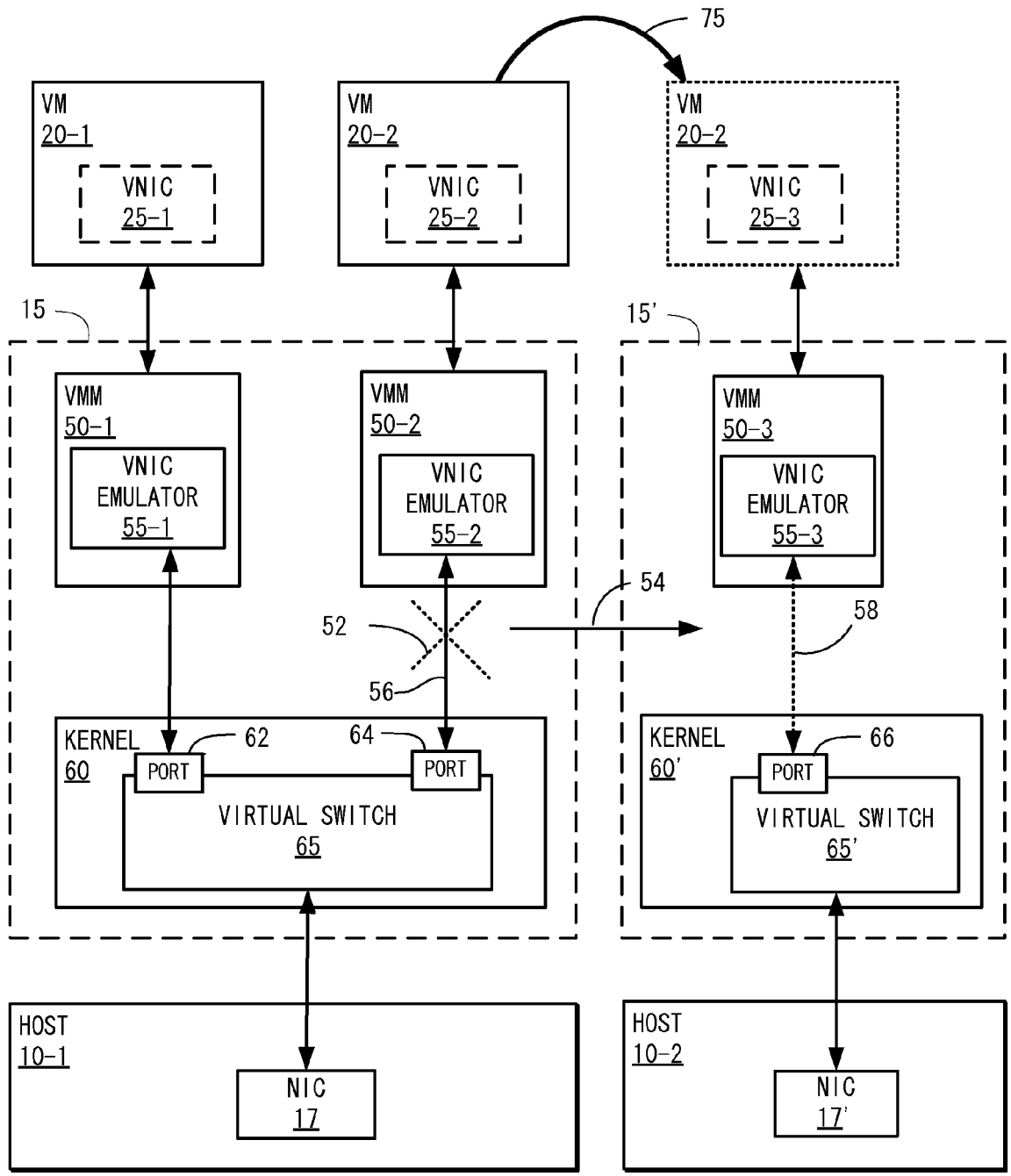
FIG. 2 illustrates the VMs and VMMs transmitting network frames to the network interface cards (NICs) of the system hardware through a virtual switch.

Once virtual NIC 215-1 is connected to DVport 352, the virtual NIC may attempt to bring the link up by making a call into system-level software on host 100-1 to request that DVport 352 be backed by a virtual port. The system-level software may be virtualization software such as virtualization software 600 or other system level software. For example, in a non-hosted virtualization system, the call may be made to a VMKernel, such as that described above with reference to FIGS. 1 and 2. In response to the call, the system-level software may then associate DVport 352 with virtual port 652 of virtual switch 602 to provide access to the desired network.

Once the link-up is successfully completed, virtual NIC 215-1 is able to send and receive frames to and from network 442.

As will be explained in more detail below with reference to FIG. 9, when virtual machine 320 powers off or is suspended, VNIC 215-1 calls into the system-level software to bring the link state down. This releases underlying virtual port 652 and resources associated with DVport 352, but does not release ownership of DVport 352. Before releasing virtual port 652, the system synchronizes all registered port state back to DVport 352. When the virtual machine powers on again or resumes, DVport 352 requests a new virtual port on host 100-1 and synchronizes all the registered port state back to it, and brings the link state up again if that is the state it was left in.

As will be explained in more detail below with reference to FIG. 8, when virtual machine 320 migrates from one host (e.g., 100-1) to another host (e.g., 100-2), the same sequence of steps as in powering down and up the VM is executed, except that the first half of the procedure for releasing the underlying virtual switch port happens on the source host and the second half of the procedure for acquiring a new underlying virtual switch port happens on the destination host. One additional step is required to transfer the DVport state to the destination host's local storage and invalidate it on the source host's local storage. Since the connection ID is part of the DVport state, VM migration causes transfer of ownership of the DVport from the source host to the destination host.

Figure 4:
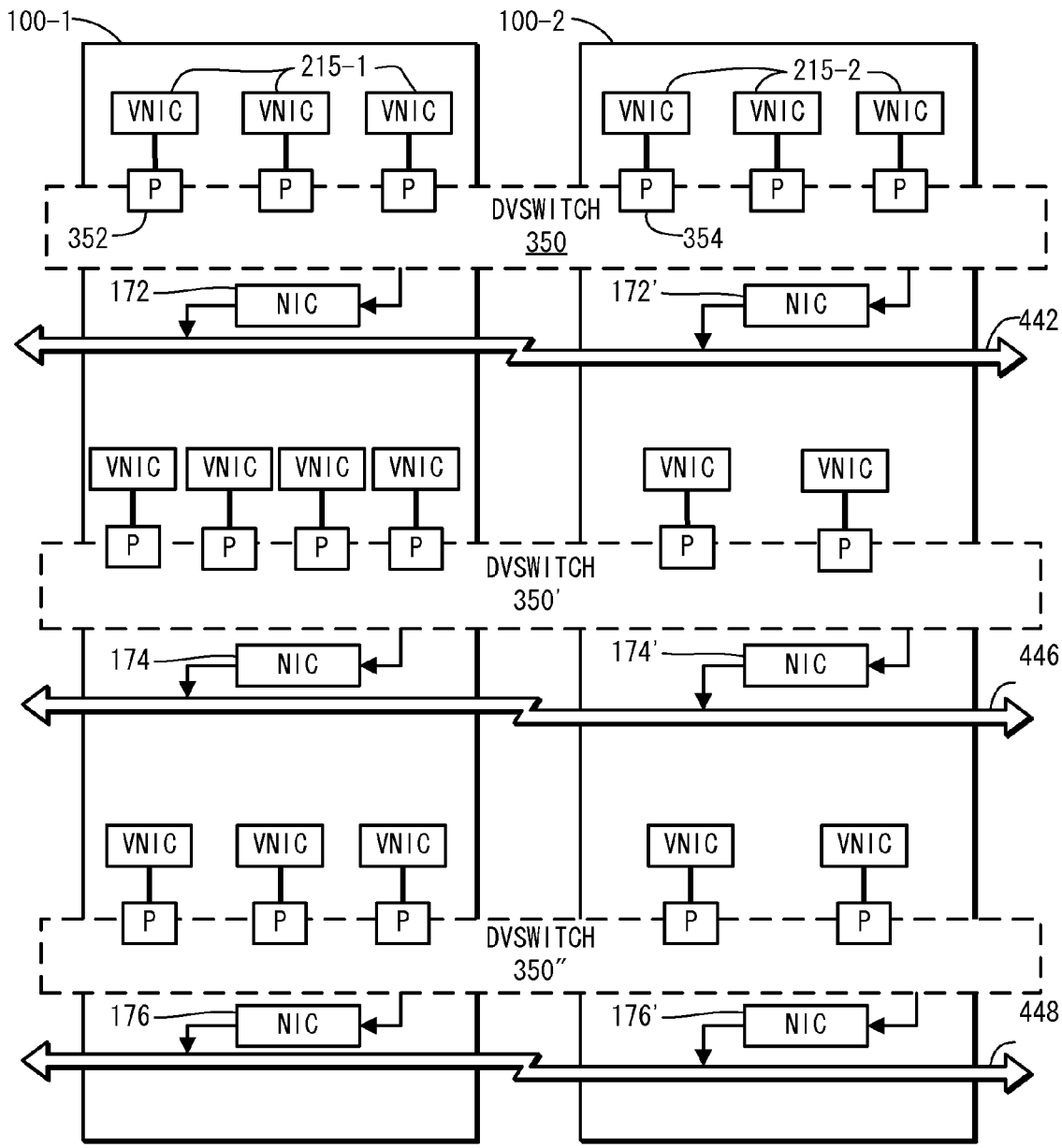
FIG. 4 illustrates how a distributed virtual port (DVport) of the DVswitch is configured, according to one embodiment.

FIG. 4 illustrates a conceptualization of a plurality of distributed virtual switches 350, 350', 350" each spanning a first and second host 100-1, 100-2. In this conceptualization, each VNIC is attached to one of three DVswitches, each of which is associated with a corresponding physical NIC for each host. Thus, VNICs 215-1, each of which may correspond to an individual VM, are each associated with a distributed virtual port, e.g., 352, 354, which are collectively managed by DVswitch 350. DVswitch 350 in turn provides connectivity to VNICs 215-1, 215-2 to network 442 via physical NICs 172, 172'. From the user's perspective, specific knowledge of settings and state of individual virtual ports 652, 654 and virtual switches 602, 602' described above with reference to FIG. 3, is unnecessary. In this way the DVswitch represents a convenient abstraction of underlying logic implementing links between VNICs and virtual switches, allowing the user to manage the DVswitch as an abstraction of a physical switch connecting each of the VMs to a particular local area network (LAN). In the present case, the "user" referred to above, may be a network or host administrator. Because the DVswitch abstracts out the settings of individual virtual switches and virtual ports, the administrator only needs to concern him- or herself with attaching DVswitch to each VNIC and configuring same. Once that is done, virtual ports and switches that back the DVports and DVswitches will automatically be properly configured when restarting or suspending and resuming a VM, even if the resume or restart is on a different host in the managed collection.

As suggested by FIG. 4, a single host 100-1 may interact with a plurality of DV switches, each associated with a corresponding network. In the present example, hosts 100-1, 100-2 each interact with DVswitches 350, 350', 350" which in turn are connected to networks 442, 446, and 448, respectively. Host 100-1 includes NIC 172 connecting DVswitch 350 to network 442, NIC 174 connecting DVswitch 350' to network 446, and NIC 176 connecting DVswitch 350" to network 448. Host 100-2 includes corresponding components, although many other configurations are possible, as would occur to those skilled in the art.

Figure 5:
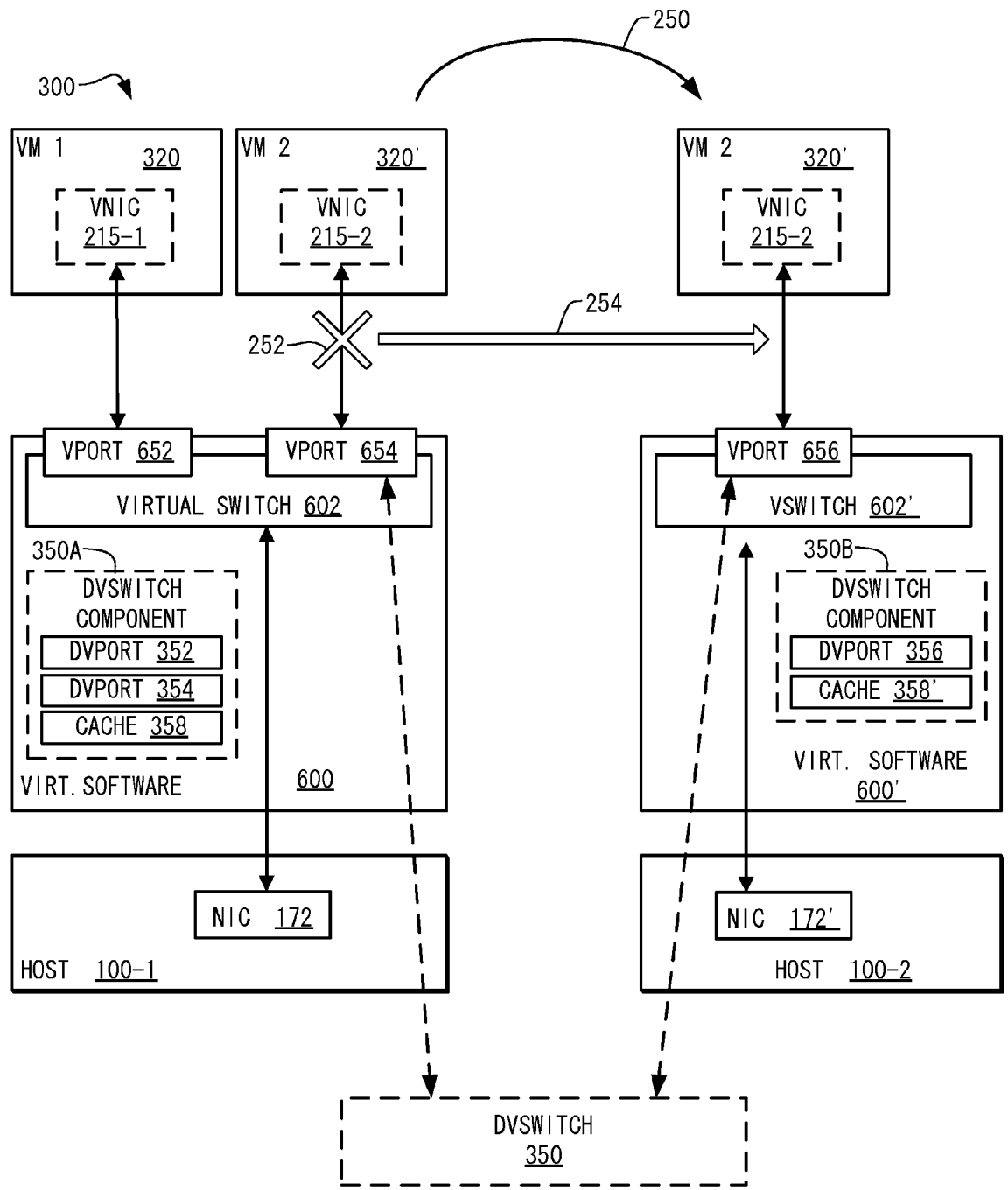
FIG. 5 illustrates how the DVswitch reconfigures a connection between a VNIC and a virtual switch during VM migration, according to one embodiment.

FIG. 5 illustrates a simplified view of collection 300 shown previously in FIG. 3, prior to a migration of VM 320' from host 100-1, to host 100-2. According to one embodiment, when VM 320' migrates from source host 100-1 to destination host 100-2, the connection between VNIC 215-2 and virtual port of the 654 of virtual switch 602 is lost, and VNIC 215-2 connects with a new virtual port 656 of virtual switch 602' on destination host 100-2. Because DVswitch 350 facilitates the transfer of the state and ownership of the DVport (e.g., 352) from the local storage 358 of source host 100-1 to the local storage 358' of destination host 100-2 through the DVswitch 350, state information that maybe accumulated on virtual switch port 654 is not lost and is also migrated to virtual port 656 of virtual switch 602'.

Extensibility

The DVswitch and DVport implementation is extensible at run time by means of registering filter and forwarding engine classes. One forwarding engine class (not shown herein) is associated with each DVswitch 350, and zero or more filter classes are associated with DVswitch 350. A forwarding class implements the basic frame forwarding logic for DVswitch 350. The forwarding class includes rules for determining and indicating which DVport(s) should receive each frame that comes into the DVswitch. Since the forwarding class is responsible for making forwarding decisions, there is only one forwarding class associated with each DVswitch 350. The forwarding class may register DVswitch and DVport specific context for configuration and runtime state. A filter class implements some type of monitoring, filtering, or transformation functionality for a DVport. Each filter class may be applied to one or more DVports and may register a port specific context for configuration and run time state.

The forwarding engine class is assigned at DVswitch creation time. Filter classes can be added or removed at any time to or from DVports. Each forwarding engine class defines a set of callbacks to implement various required and optional functionalities. Each forwarding engine class may also optionally declare one or more opaque data types to be maintained by the system. These data will be appended to the DVswitch and DVport state which is migrated and persisted by the system.

FIG. 6 illustrates, by way of example, a process for creating and deleting a DVswitch, according to one embodiment. Referring now to FIGS. 3 and 6, in operation 601, database controller 372 creates a new DVswitch entry 350C and DVports of the DVswitch in database 370. In this regard, DVswitch 350 is associated with a forwarding engine service class and class-specific DVswitch state. In order to create a new DVport entry in database 370, the DVport entry is associated with a given DVswitch, and the DVport state is initialized to default values. For example, the "current connection ID" of the DVport may be set to the "DVPORT_NO_CONNECTION" to indicate that no virtual NIC is currently connected to the DVport. Database controller 372 pushes the new DVport information out to all hosts 100-1, 100-2 in the managed domain, which store it in local storage 358, 358'. In addition, database controller 372 may also install a DVport filter by associating an opaque class-defined state with the DVport's state.

In operation 604, a host joins the created DVswitch 350. In one embodiment, this operation is initiated by database controller 372, which (i) verifies that the host (e.g., 100-1, 100-2) can provide appropriate network connectivity and services to host a portion of the given DVswitch, (ii) adds the host to the list of hosts associated with DVswitch 350 in database 370, and (iii) pushes the current DVswitch data out to the to-be-connected host, which stores it in its local storage.

In operation 606, a host leaves the DVswitch. In one embodiment, this operation is initiated by database controller 372, which (i) verifies that the host (e.g., 100-1, 100-2) to leave the DVswitch does not currently have any DVports (e.g., 352, 354, . . . , 362) from the given DVswitch delegated to it, (ii) contacts the host (e.g., 100-1, 100-2) to indicate that it should clear its local storage of any data associated with the given DVswitch, and (iii) removes the host from the list of hosts associated with the DVswitch 350 in database 370. Note that a host may join 604 and leave 608 a DVswitch multiple times over the lifetime of the DVswitch.

In operation 608, database controller 372 deletes a DVswitch (e.g., 350) from database 370. To delete the DVswitch (e.g., 350), database controller 372 makes sure that all hosts have left the DVswitch and then removes all states corresponding to the DVswitch from database 370.

FIG. 7 illustrates a process for connecting or disconnecting a VNIC to or from a DVport of the DVswitch, according to one embodiment. In step 702, a virtual NIC (e.g., 215-1) is connected to a requested DVport (e.g., 352) of DVswitch 350. In one embodiment, this operation is initiated via database controller 372, which checks for existing connections on the requested DVport (e.g., 352) by ensuring that the current connection ID is DVPORT_NO_CONNECTION, indicating that no virtual NIC is currently connected to that requested DVport. If another virtual NIC is currently connected to the requested DVport, then the request to connect the VNIC to the requested DVport is denied. If the requested DVport is available, then database controller 372 generates a new connection ID and sets the "current connection ID" for the requested DVport (e.g., 352) to the new connection ID. Database controller 372 pushes the updated DVport data to the host (e.g., 100-1) which currently hosts the virtual NIC (e.g., 215-1) and sets the "connection ID" field of the virtual NIC configuration to the new connection ID as well.

In step 704, a virtual port (e.g., 652) of the virtual switch 602 is "linked up" to the "connected" virtual NIC (e.g., 215-1). In one embodiment, this operation occurs on the host (e.g., 100-1) where the virtual NIC (e.g., 215-1) is hosted and does not require participation from database controller 372. The virtual NIC (e.g., 215-1) calls into the host system level software (e.g., virtualization software 600) identifying the DVport (e.g., 352) it is connected to and provides a connection ID. The DVswitch system validates that the DVport (e.g., 352) is in fact currently delegated to this host (e.g., 100-1). In one embodiment, the presence of DVport data with a current connection ID other than DVPORT_NO_CONNECTION is sufficient for validating that the DVport (e.g., 352) is delegated to this host (e.g., 100-1). The DVswitch system validates that the connection ID provided by the virtual NIC (e.g., 215-1) matches the current connection ID in the DVport data. If the connection ID data does not match, the request to bring the link up is denied. If the connection ID data does match, port resources on the local per-host virtual switch (e.g., 602) are allocated to the virtual NIC (e.g., 215-1), and the virtual NIC implementation is passed a handle to the resources. Class-defined callbacks for any installed forwarding classes or filtering classes are installed on the underlying virtual switch port (e.g., 652) and virtual switch port state is restored from the host's local storage using class-defined deserializers. As a result, the virtual switch port (e.g., 652) is enabled for 10.

In step 706, a virtual port of the virtual switch may also be "linked down" from the "connected" virtual NIC (e.g. 215-1). In one embodiment, this operation occurs on the host (e.g., 100-1) where the virtual NIC (e.g., 215-1) is hosted and does not require any participation from the database controller 372. The virtual NIC (e.g., 215-1) calls into the system indicating that it would like to release the virtual switch port (e.g., 652) resources on the host (e.g., 100-1). As a result, all IO and other activity on the virtual switch port (e.g., 652) is quiesced. The DVswitch system collects all transparent DVport state from the underlying virtual switch port (e.g., 652). Class-defined callbacks for any installed forwarding classes or filtering classes are removed from the underlying virtual switch port (e.g., 652) and state is checkpointed to the host's local storage using class-defined serializers. Note that a virtual port of a virtual switch may be linked up or linked down multiple times over the lifetime of a virtual NIC connection to the DVport of a DVswitch.

In step 708, the virtual NIC (e.g., 215-1) may be disconnected from a DVport (e.g., 352). In one embodiment, this operation is initiated via the database controller 372, which pushes an update of the current connection ID to the host (e.g., 100-1) to which the DVport (e.g., 352) is currently delegated, setting the current connection ID to DVPORT_NO_CONNECTION. Upon receiving this update, the host (e.g., 100-1) brings the virtual port link state down if the link state is not already down, and pulls the DVport state back from the host's local storage to synchronize the database 370.

Figure 8:
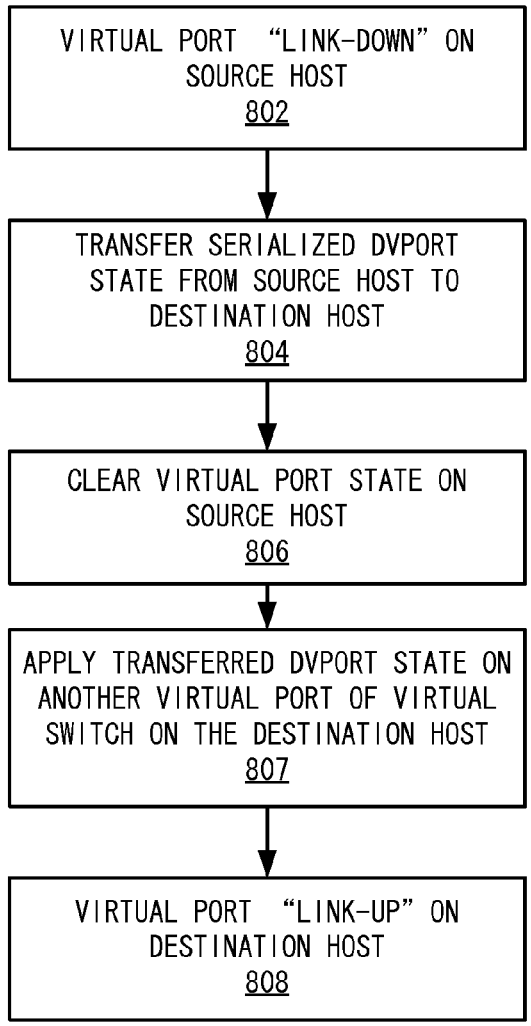
FIG. 8 illustrates a process for DVport migration during VM migration, according to one embodiment.

FIG. 8 illustrates a process for DVport migration during VM migration, according to one embodiment. Referring to FIGS. 5 and 8, a DVport (e.g., 354) may be migrated between the hosts 100-1, 100-2 in the same way virtual machines (e.g., 200-2) are migrated. At a high level, DVports project their state onto an available virtual switch port to provide a consistent network connection for virtual NICs (e.g., 215-2) as they migrate from the source host (e.g., 100-1) to the destination host (e.g., 100-2).

In one embodiment, DVport migration is initiated via the database controller 372, which performs the following operations for each virtual NIC in the affected virtual machine (e.g., 200-2) to be migrated. In operation 802, database controller 372 brings the DVport (e.g., 354) to be migrated down on the source host (e.g., 100-1) by performing "virtual port link down" on the source host (e.g., 100-1) as described above with reference to FIG. 7. In operation 804, the serialized state for the DVport (e.g., 354) to be migrated from the local storage (e.g., 358) of the source host (e.g., 100-1) is transferred to the local storage (e.g., 358') of the destination host (e.g., 100-2). In pushing the state for the DVport to the destination host, database controller 372 delegating ownership of the DVport to the destination host. In operation 806, Database controller 372 clears the virtual port state on the source host (e.g., 100-1), thereby revoking its ownership of the DVport (e.g., 352). In operations 807 and 808 database controller 372 brings the DVport up on the destination host (e.g., 100-2) by applying the transferred state of the DVport (e.g., 354) to another virtual port of the virtual switch (e.g., 602') on the destination host (e.g., 100-2) and performing virtual port "link up" on the destination host (e.g., 100-2) as described above.

Figure 9:
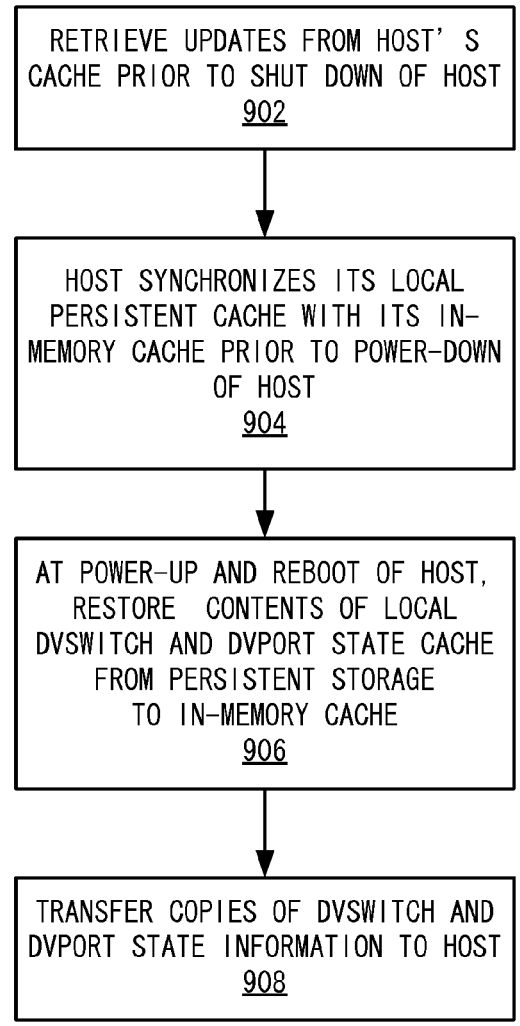
FIG. 9 illustrates a process for reconfiguring a DVswitch while powering down and powering up a host, according to one embodiment.

FIG. 9 illustrates, by way of example, a process for reconfiguring the DVswitch while powering down and powering up the host, according to one embodiment. These operations may occur with or without the participation of database controller 372. If database controller 372 is aware of the imminent power down event, it may perform operation 902, in which database controller 372 retrieve updates from the host's local storage just before shut down of the host (e.g., 100-1). In operation 904, prior to power down, the host (e.g., 100-1) synchronizes its persistent local storage with its in-memory cache, if persistent storage is available. In operation 906, the contents of the DVswitch and DVport state are restored from the local storage to the host's in-memory cache immediately upon reboot if the host has a copy of its local DVswitch and DVport state cache on persistent local storage. In operation 908, database controller 372 transfers copies of all relevant DVswitch and DVport state to the host (e.g., 100-1) as soon as it detects the host's presence. Database controller 372 may attempt to merge or otherwise resolve conflicts between stale data from the host's cache and data from database 370. In one embodiment, data from database 370 is considered authoritative and overwrites any state maintained in local storage. Database controller 372 pushes the resulting updates to the host (e.g., 100-1).

Upon reading this disclosure, those of skill in the art will appreciate still additional alternative structural and functional designs for a distributed virtual switch through the disclosed principles herein. Particular embodiments may also be implemented using a non-transitory tangible medium embodying machine readable instructions. Certain method operations described above may be performed concurrently or in different orders than that described. While particular embodiments and applications have been illustrated and described, it is to be understood that that various modifications, changes and variations which will be apparent to those skilled in the art may be made in the arrangement, operation and details of the method and apparatus of the embodiments disclosed herein without departing from the spirit and scope of the invention as defined in the appended claims.

What is claimed is:

1. A method for persisting a state of a virtual port in a virtualized computer system having at least one virtual machine, virtualization software logically interposed between the virtual machines and system hardware, each virtual machine including at least one virtual network interface card (VNIC), the virtualization software implementing the VNIC using emulation software and a virtual switch, the virtual switch comprising a virtual port corresponding to each of the VNICs, the virtual switch functioning to forward network frames between the VNICs and one or more physical network interface cards (NICs) connected to the system hardware, the method comprising:

storing a distributed virtual port (DVport) in a persistent storage location, the DVport comprising a runtime state and configuration settings for a first link between a VNIC corresponding to a virtual machine and a virtual switch associated with a first virtual port; and restoring a state from the DVport to a second virtual port using the runtime state and configuration settings from the persistent storage location when the VM corresponding to the connected VNIC is restarted, the restoring of the state allowing the second virtual port to establish a second link to forward network frames between the VNIC corresponding to the restarted VM and a virtual switch associated with the second virtual port, the second link being established with the state of the first link.

2. The method of claim 1, wherein the DVport further comprises a unique connection identifier (ID), the method further comprising:

the storing an association between the DVport and the VNIC corresponding to the VM; and storing the connection ID along with a VNIC state when the virtual machine is shut down or suspended, wherein the connection ID is used to restore the state from the DVport to the second virtual port.

3. The method of claim 1, wherein:

the virtualized computer system is one of a managed collection of hosts;

when the VM is shut down or suspended on a first host and subsequently restarted on a second host different from the first host, the state from the DVport is restored to the second virtual port on the second host; and the VNIC corresponding to the restarted VM and the virtual switch associated with the second virtual port are located on the second host.

4. The method of claim 1, wherein:

the virtualized computer system is one of a managed collection of hosts; and a collection of the virtual ports for the collection hosts form a distributed virtual switch.

5. The method of claim 4, wherein the distributed virtual switch is managed as an abstraction of a physical switch that is connected to each of the VMs running on the collection of hosts that are connected to a physical local area network (LAN).

6. The method of claim 1, wherein the persistent storage location includes a database maintained on a separate server.

7. The method of claim 6, wherein the separate server is accessed via a network independent of the VNICs.

8. The method of claim 1, wherein a collection of DVports forms a distributed virtual switch, the method further comprising attaching the VM to the virtual switch by:

transmitting a request for a connection to the DVport from the VNIC of the VM to a database controller responsible for managing the distributed virtual switch;

determining that the DVport is currently unassigned to another VNIC, and initializing the DVport to an initial state and default configuration;

generating a new connection ID corresponding to the DVport in response to the request and transmitting the new connection ID to the VNIC;

passing the initialized state and default configuration of the DVport to the first virtual port that backs up the DVport, so that the first virtual port assumes the state and configuration of the DVport;

transmitting a request from the VNIC to system level software of the virtualized computer system to back the DVport with the first virtual port, the system level software responding to the request by associating the DVport with the first virtual port of the virtual switch; and linking the first virtual port configured to back up the DVport with the VNIC to which the DVport is assigned so that the VNIC and virtual switch associated with the first virtual port can exchange network frames.

9. The method of claim 8, wherein the database controller resides on a server computer that is separate from virtualized computer system.

10. The method of claim 1, wherein a collection of DVports forms a distributed virtual switch and the restoring of the state comprises:

transmitting a connection ID of the DVport to a database controller responsible for managing the distributed virtual switch;

determining that the restarted VM is assigned to the DVport and correspondingly transmitting the runtime state and configuration settings of the DVport to the restarted VM;

assigning the second virtual port to backup the DVport assigned to the restarted VM and causing the second virtual port to assume the runtime state and configuration settings of the DVport; and linking the second virtual port with the VNIC corresponding to the restarted VM to which the DVport is assigned so that the VNIC corresponding to the restarted VM and the virtual switch associated with the second virtual port can exchange network frames.

11. The method of claim 1, further comprising:

modifying the configuration of the DVport; and causing the modification of the DVport to take effect immediately regardless of the DVport host location and running state.

12. A non-transitory tangible medium embodying machine readable instructions causing a computer to perform a method for persisting a state of a virtual port in a virtualized computer system having at least one virtual machine, virtualization software logically interposed between the virtual machines and system hardware, each virtual machine including at least one virtual network interface card (VNIC), the virtualization software implementing the VNIC using emulation software and a virtual switch, the virtual switch comprising a virtual port corresponding to each of the VNICs, the virtual switch functioning to forward network frames between the VNICs and one or more physical network interface cards (NICs) connected to the system hardware, the method comprising:

storing a distributed virtual port (DVport) in a persistent storage location, the DVport comprising a runtime state and configuration settings for a first link between a VNIC corresponding to a virtual machine and a virtual switch associated with a first virtual port; and restoring a state from the DVport to a second virtual port using the runtime state and configuration settings from the persistent storage location when the VM corresponding to the connected VNIC is restarted, the restoring of the state allowing the second virtual port to establish a second link to forward network frames between the VNIC corresponding to the restarted VM and a virtual switch associated with the second virtual port, the second link being established with the state of the first link.

13. The tangible medium of claim 12, wherein the DVport further comprises a unique connection identifier (ID), the method further comprising:

the storing an association between the DVport and the VNIC corresponding to the VM; and storing the connection ID along with a VNIC state when the virtual machine is shut down or suspended, wherein the connection ID is used to restore the state from the DVport to the second virtual port.

14. The tangible medium of claim 12, wherein:

the virtualized computer system is one of a managed collection of hosts;

when the VM is shut down or suspended on a first host and subsequently restarted on a second host different from the first host, the state from the DVport is restored to the second virtual port on the second host; and the VNIC corresponding to the restarted VM and the virtual switch associated with the second virtual port are located on the second host.

15. The tangible medium of claim 12, wherein:

the virtualized computer system is one of a managed collection of hosts; and a collection of the virtual ports for the collection hosts form a distributed virtual switch.

16. The tangible medium of claim 15, wherein the distributed virtual switch is managed as an abstraction of a physical switch that is connected to each of the VMs running on the collection of hosts that are connected to a physical local area network (LAN).

17. The tangible medium of claim 12, wherein the persistent storage location includes a database maintained on a separate server.

18. The tangible medium of claim 17, wherein the separate server is accessed via a network independent of the VNICs.

19. The tangible medium of claim 12, wherein a collection of DVports forms a distributed virtual switch, the method further comprising attaching the VM to the virtual switch by:
  transmitting a request for a connection to the DVport from the VNIC of the VM to a database controller responsible for managing the distributed virtual switch;
  determining that the DVport is currently unassigned to another VNIC, and initializing the DVport to an initial state and default configuration;
  generating a new connection ID corresponding to the DVport in response to the request and transmitting the new connection ID to the VNIC;
  passing the initialized state and default configuration of the DVport to the first virtual port that backs up the DVport, so that the first virtual port assumes the state and configuration of the DVport;
  transmitting a request from the VNIC to system level software of the virtualized computer system to back the DVport with the first virtual port, the system level software responding to the request by associating the DVport with the first virtual port of the virtual switch; and
  linking the first virtual port configured to back up the DVport with the VNIC to which the DVport is assigned so that the VNIC and virtual switch associated with the first virtual port can exchange network frames.

20. The tangible medium of claim 19, wherein the database controller resides on a server computer that is separate from virtualized computer system.

21. The tangible medium of claim 12, wherein a collection of DVports forms a distributed virtual switch and the restoring of the state comprises:
  transmitting a connection ID of the DVport to a database controller responsible for managing the distributed virtual switch;
  determining that the restarted VM is assigned to the DVport and correspondingly transmitting the runtime state and configuration settings of the DVport to the restarted VM;
  assigning the second virtual port to backup the DVport assigned to the restarted VM and causing the second virtual port to assume the runtime state and configuration settings of the DVport; and
  linking the second virtual port with the VNIC corresponding to the restarted VM to which the DVport is assigned so that the VNIC corresponding to the restarted VM and the virtual switch associated with the second virtual port can exchange network frames.

22. The tangible medium of claim 12, the method further comprising:
  modifying the configuration of the DVport; and
  causing the modification of the DVport to take effect immediately regardless of the DVport host location and running state.

23. A method comprising:
  determining a migration of a virtual machine (VM) from a first host to a second host, wherein, in the first host, a first link between a virtual network interface card (VNIC) corresponding to a virtual machine and a first virtual switch associated with a first virtual port to forward data between the VNIC and first virtual switch was disconnected, wherein a state of the first link is persisted in a distributed virtual port (DVport) that is associated with a first virtual port of the first virtual switch before disconnection of the VNIC and the first virtual switch;
  connecting, on the second host, the VNIC corresponding to the migrated virtual machine to the DVport, the DVport comprising the state of the first link on the first host;
  applying the state from the DVport to a second virtual port of a second virtual switch; and
  establishing, in the second host, a second link between the VNIC and the second virtual switch associated with the second virtual port to forward data between the VNIC and second virtual switch, the second link in the second host being established with the state of the first link applied to the second virtual port.

* * * * *